United States Patent

Nakamura

[15] 3,649,912
[45] Mar. 14, 1972

[54] DIRECT CURRENT TRANSFORMER EMPLOYING MAGNETORESISTANCE DIODES FOR USE IN CURRENT MEASUREMENT

[72] Inventor: Tetsuji Nakamura, Tokyo, Japan
[73] Assignee: Tokyo Shibaura Electric Co., Ltd., Kawasaki-shi, Japan
[22] Filed: Apr. 8, 1969
[21] Appl. No.: 814,260

[30] Foreign Application Priority Data

Apr. 10, 1968  Japan..................................43/23576

[52] U.S. Cl. ............................324/127, 324/46, 324/117 R
[51] Int. Cl.........................................G01r 1/22, G01r 33/02
[58] Field of Search....................324/127, 117, 99, 105, 119, 324/45, 46, 65, 65 TC, 76 R, 123; 73/88.5; 330/30 D, 69

[56]  References Cited

UNITED STATES PATENTS

| 2,157,006 | 5/1939 | Oesinghaus | 324/117 |
|---|---|---|---|
| 2,928,048 | 3/1960 | Postal | 324/117 X |
| 2,946,955 | 7/1960 | Kuhrt | 324/45 X |
| 3,226,640 | 12/1965 | Kuhrt et al. | 324/117 X |
| 3,315,162 | 4/1967 | Liddle | 324/119 X |
| 3,323,057 | 5/1967 | Haley | 324/117 |
| 3,350,635 | 10/1967 | Mesch | 324/99 X |
| 3,430,142 | 2/1969 | Covert | 324/117 |
| 3,519,899 | 7/1970 | Yamada | 324/46 X |
| 3,535,626 | 10/1970 | Uemura et al. | 324/46 |

FOREIGN PATENTS OR APPLICATIONS

| 618,580 | 6/1957 | Canada | 324/117 |
|---|---|---|---|

Primary Examiner—Rudolph V. Rolinec
Assistant Examiner—Ernest F. Karlsen
Attorney—Flynn & Frishauf

[57]  ABSTRACT

This is a direct current transformer wherein there is inserted through the interior space of a C-shaped core a primary conductor through which there flows a direct current; there is disposed a magnetosensitive semiconductor device in a space defined between both ends of said core; a difference between the value of voltages obtained in proportion to the magnetic fluxes generated by the direct current travelling across both terminals of the magnetosensitive semiconductor device and the value of output voltages obtained from a constant voltage element serially connected to the magnetosensitive semiconductor device without being affected by the magnetic fluxes, is amplified by a differential amplifier; a current determined by said voltage difference is impressed, after being amplified, on a coil wound around part of the C-shaped core to generate such magnetic fluxes as offsetting the magnetic fluxes produced in the core by an electric current introduced through the primary conductor thereby always to maintain the magnetic fluxes prevailing in the core substantially at zero and current outputs from the differential amplifier are measured to find the value of the direct current passing through the primary conductor.

10 Claims, 11 Drawing Figures 3,649,912

TETSUJI NAKAMURA,
INVENTOR.

3,649,912

1

DIRECT CURRENT TRANSFORMER EMPLOYING MAGNETORESISTANCE DIODES FOR USE IN CURRENT MEASUREMENT

BACKGROUND OF THE INVENTION

The present invention relates to improvements in a direct current transformer using a magnetosensitive semiconductor device.

A direct current transformer heretofore used in measuring a large direct current at the primary side by converting it at the secondary side to a small current adapted for measurement includes, for example, an apparatus using saturable reactors. In this apparatus, a pair of saturable cores penetrated by a primary bus are respectively wound with a secondary coil. The terminal ends of both coils are serially connected. One end of an AC source is connected to the initial end of one of the secondary coils and the other end of said source to the initial end of the other secondary coil through an AC ammeter.

The aforesaid paired secondary coils generate electromotive forces whose opposite polarities correspond to those of magnetic fluxes produced in the paired saturable cores by a direct current running through the primary bus, so that these magnetic fluxes offset each other.

In a direct current transformer involving saturable reactors bearing the aforementioned relationship with each other, one of the saturable reactors presents impedance to one of the half waves of exciting current from the AC source and the other saturable reactor also displays impedance to the other half wave of said exciting current. These impedances vary with the magnitude of a large direct current at the primary side, namely, the larger the direct current, the more reduced will be the impedance. Accordingly, the secondary alternating current passing through the secondary coils is made proportionate to the magnitude of the direct current, so that measurement of said secondary alternating current by ammeter indicates the value of the original direct current.

Nevertheless, a direct current transformer using the aforementioned saturable reactors has the drawbacks described below. To begin with, the different compositions of the material of the paired cores often lead to varied properties, so that there is required time in making correct calibration using a special instrument. In the second place, the saturable reactor is readily affected by the surrounding magnetic field, resulting in gross errors of measurement. Therefore, the required prevention of such errors restricts the shape and arrangement of a direct current bus. In the third place, there are also caused errors of measurement by variations in the frequency, voltage, waveform or the like of an AC source used in exciting the secondary coil, presenting difficulties in accurate measurement of a direct current. In the fourth place, there is a wide divergence of winding between the primary coil or bus and the secondary coil. If, therefore, a direct current passing through the bus contains a pulsating component as does the output current, for example, from a thyristor rectifier, then there will be induced a great surge voltage into the secondary coil, leading to the destruction of interphase insulation.

Another prior art direct current transformer involves a Hall element. According to this apparatus, the Hall element is inserted into the interior space of the core. The magnetic fluxes generated in the core by a primary current are allowed to pass through the Hall element disposed in said space. When a direct current flows across the terminals provided on one pair of opposite sides there is obtained a Hall voltage at the terminals positioned on the other pair of opposite sides. Since the Hall voltage is proportionate to the value of the primary current, measurement of said voltage indicates the value of the primary current.

However, an apparatus using the aforementioned Hall element has the undermentioned shortcomings. First, the Hall voltage is so weak that it must be sufficiently amplified for use in measurement, requiring a high amplification unit. Such amplifier is subject to various inductive actions, leading to errors of measurement. Secondary, there has been devised an apparatus which involves a large number of Hall elements scattered at various parts of the core with the view of increasing the Hall voltage. However, such apparatus causes the construction of a core to be complicated, presenting disadvantage in fabrication.

SUMMARY OF THE INVENTION

The object of the present invention is to provide a direct current transformer having the undermentioned advantages by eliminating the aforementioned drawbacks encountered with the conventional apparatus, wherein the fact is utilized that a magnetosensitive semiconductor device (hereinafter referred to as "MSD") varies in the resistance presented in its forward direction in accordance with the amount of magnetic flux travelling through said device; a difference between the value of output voltages from MSD corresponding to variations in the magnetic flux generated in the core by a primary current and the value of output voltages obtained independently of said variations in the magnetic flux from a constant voltage element serially connected to MSD is impressed, after being amplified by a differential amplifier, on a coil wound around part of the C-shaped core, through the interior space of which is inserted a primary conductor so as to cause the magnetic flux produced by the direct current flowing through the primary conductor to be offset by the magnetic flux generated by a current passing through the coil.

The advantages offered by the direct current transformer of the present invention are:

1. The magnetic fluxes generated in the core by a direct current travelling through a direct current bus are offset by the magnetic fluxes produced in said core by a feed back current flowing through a supplementary coil wound around said core so as to use the core with the magnetic fluxes present therein reduced almost to zero, thus making it possible to minimize the cross sectional area of the core.

2. High sensitivity is obtained in measurement, because it is carried out at around zero point of magnetic fluxes at which MSD displays a prominent magnetosensitivity.

3. A direct current can be measured with extremely high sensitivity or accuracy by elevating the degree of amplification performed by a differential or ordinary amplifier. Further, adjustment of the degree of amplification enables the accuracy, with which a direct current should be measured, to be varied freely as desired.

4. Separation of the core into a main core member $SR_1$ and supplementary core member $SR_2$ eliminates the induction of voltage into a supplementary coil resulting from sudden change in a direct current ID passing through a primary bus, thus permitting easy insulation of said supplementary coil and preventing an amplifier from being impressed with a surge voltage.

DETAILED DESCRIPTION OF THE PREFERRED EMBODIMENTS

Figure 1:
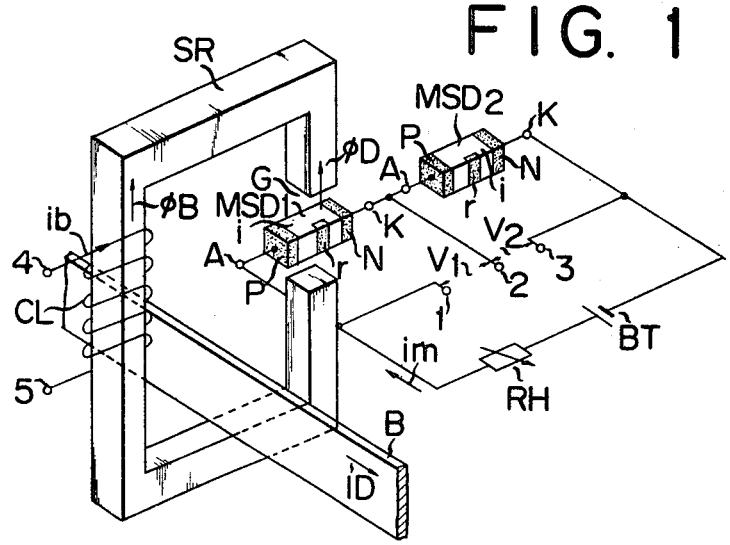
FIG. 1 is a schematic arrangement of the main part of a direct current transformer according to an embodiment of the present invention.
Figure 2:
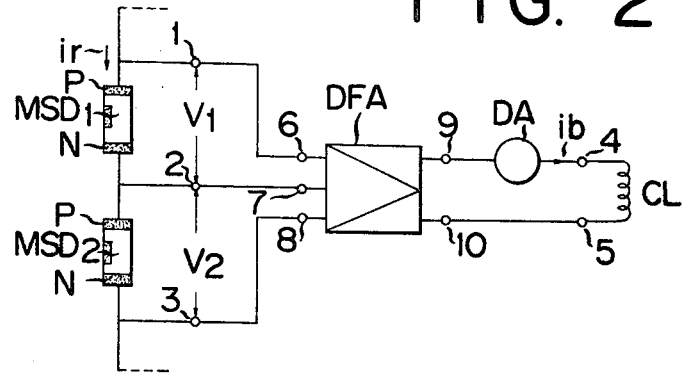
FIG. 2 is a circuit diagram illustrative of the other main part of the invention.

FIG. 1 represents a first embodiment of the present invention. Character B denotes a direct current bus through which there flows a direct current to be measured and ID shows the direct current passing through said bus B in the indicated direction. There is provided a core SR so as to form a magnetic passage surrounding the bus B. Part of the core has a void space G into which is inserted, as shown, one of the MSD's used, namely, $MSD_1$. Apart from $MSD_1$ there is disposed another unit $MSD_2$ at a place free from the effect of a magnetic field produced in the core SR. The core SR is wound with a supplementary coil CL, which is excited by outputs from a separate amplifier DFA (FIG. 2).

Now let it be assumed that there is generated in said coil magnetic fluxes $\phi B$ in such a direction as offsetting the magnetic fluxes $\phi D$ produced in the core SR by a direct current ID travelling through the primary bus. There are additionally provided a storage battery BT and adjusting resistor RH to form a closed circuit involving plus terminal of storage battery BT − adjusting resistor RH − terminal A of $MSD_1$ − terminal K of $MSD_1$ − terminal A of $MSD_2$ − terminal K of $MSD_2$ − minus terminal of storage battery BT. The terminal A of $MSD_1$ is connected to a voltage output terminal 1, the contact of the terminal K of $MSD_1$ with the terminal A of $MSD_2$ is connected to the terminal 2, and the terminal K of $MSD_2$ is connected to the terminal 3. Now let the output voltage between the terminals 1 and 2 be denoted as $V_1$ and the output voltage between the terminals 2 and 3 be designated as $V_2$. FIG. 2 illustrates a circuit for receiving output voltages from $MSD_1$ and $MSD_2$ of FIG. 1 through the terminals 1, 2 and 3 to obtain amplified outputs in proportion the potential difference between $V_1$ and $V_2$ and feeding back outputs representing said difference to the supplementary coil CL wound around the core SR. The same parts of FIG. 2 as those of FIG. 1 are denoted by the same numerals. $MSD_1$ and $MSD_2$ are supplied with a suitable current $im$ by the storage battery BT which flows in their forward direction. The terminals 1, 2 and 3 for voltage outputs from $MSD_1$ and $MSD_2$ are connected to the input terminals 6, 7 and 8 respectively of a separately provided differential amplifier DFA as 1 to 6, 2 to 7 and 3 to 8. One direct current output terminal 9 of the differential amplifier DFA is connected to one terminal 4 of the supplementary coil CL through a DC ammeter DA and the other terminal 10 of said amplifier DFA to the other terminal 5 of said ammeter DA. Now let it be assumed that direct current outputs $ib$ from the differential amplifier DFA flows in the direction of 9 − DA − 4 − CL − 5 − 10, and that the differential amplifier DFA is actuated to an extent corresponding to a difference between the input voltage $V_1$ across its input terminals 6 and 7 and the input voltage $V_2$ across its input terminals 7 and 8, namely, direct current outputs rising with increasing value of $\Delta V = |V_1 - V_2|$.

Figure 4:
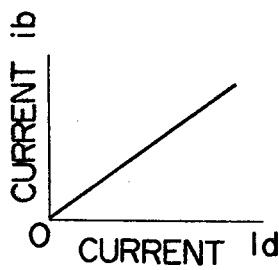
FIGS. 3 and 4 represent the properties of said embodiment for illustration of its function.
Figure 3:
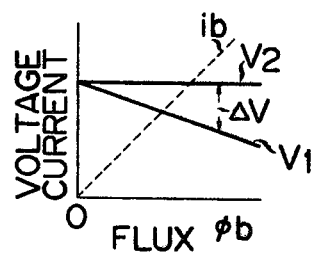

There will now be described the operation of a direct current transformer according to the aforementioned embodiment. $MSD_1$ and $MSD_2$ used are of such type that where there is no magnetic field acting thereon, they display an equal resistance in the forward direction. The resistances presented by $MSD_1$ and $MSD_2$ in the forward direction are denoted as $RD_1$ and $RD_2$ respectively, and the value of an adjusting resistor RH is set at a level fully higher than a sum of $RD_1+RD_2$. Now let it be assumed that slight variations in $RD_1$ and $RD_2$ do not substantially effect a current $im$ supplied by the storage battery BT. If a direct current ID flows through the primary bus B and in consequence magnetic fluxes $\phi d$ penetrate $MSD_1$ its magnetosensitivity will cause $RD_1$ to be reduced with the resultant decrease in the voltage $V_1$. On the other hand, $MSD_2$ is positioned at a place free from the effect of the magnetic fluxes $\phi D$, so that the resistance $RD_2$ in its forward direction does not change (if necessary, $MSD_2$ may be housed in an iron case so as to keep it from the effect of an external magnetic field). Accordingly, when the direct current ID or the resultant magnetic fluxes $\phi D$ vary, the output voltage 1 across the voltage output terminals 1 and 2 decreases in inverse proportion to increases in the magnetic fluxes $\phi D$, while the voltage $V_2$ across the voltage output terminals 2 and 3 indicates a constant value, as shown in FIG. 3. Thus the voltage difference $\Delta V$ rises in proportion to increases in the magnetic fluxes $\phi D$. The differential amplifier DFA receives inputs $V_1$ and $V_2$ across the input terminals 6 and 7 and input terminals 7 and 8 respectively, and direct current outputs $ib$ from said amplifier DFA rise with increasing $\Delta V$. The differential amplifier DFA has such a property that in case of $\Delta V=0$, $ib$ will also be reduced to zero. The current outputs from said amplifier DFA have such characteristics as shown by the dotted line of FIG. 3. When the current outputs $ib$ from the differential amplifier DFA are introduced into the supplementary coil CL there will be generated magnetic fluxes $\phi b$ travelling in an opposite direction to the magnetic fluxes $\phi D$. If the number of windings of the supplementary coil CL and the volume of current outputs $ib$ are suitably selected, the resultant magnetic fluxes $\phi B$ will be able fully to offset the magnetic fluxes $\phi D$. If the differential amplifier DFA has a fully high rate of amplification GA, then the current outputs $ib$ will rise to the extent that the magnetic fluxes $\phi B$ can substantially offset the magnetic fluxes $\phi D$. Accordingly, there is established an equilibrium when the magnetic fluxes in the space G of the core SR are reduced to zero as $\phi D - \phi B = 0$, and $V_1$ and $V_2$ are made substantially equal. If there is formed a feedback circuit for detecting variations in the direct current ID flowing through the primary bus B, namely, the magnetic fluxes $\phi D$ in the form of the voltage difference between $MSD_1$ and $MSD_2$ and causing said magnetic fluxes $\phi D$ to be offset by the magnetic fluxes $\phi B$ generated in the supplementary coil CL by the amplified current outputs from the differential amplifier DFA, then there will be obtained, as shown in FIG. 4, the characteristics of current outputs $ib$ proportionate to the magnitude of the direct current ID travelling through the primary bus B. It will be apparent that the present invention is also applicable in an automatic direct current control device wherein the DC ammeter DA is replaced by a suitable detector for measuring the magnitude of current outputs $ib$, and a separately provided amplifier is supplied with signals proportionate to the magnitude of current outputs $ib$ to control a source of the direct current ID by the resultant outputs from said amplifier, thereby automatically to control the magnitude of the direct current ID. The object of elevating the accuracy of measuring a direct current ID can be easily effected by carrying out determination in the vicinity of zero point of magnetic fluxes at which MSD displays high magnetosensitivity and increasing the sensitivity of the differential amplifier DFA.

Figure 5:
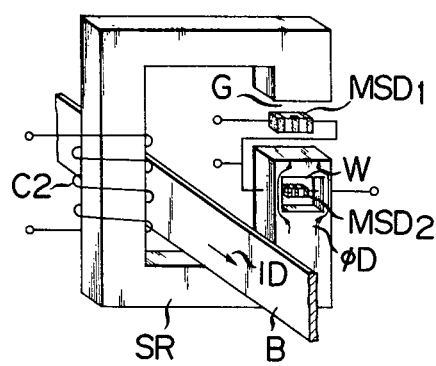
FIG. 5 is a schematic arrangement of the main part of a direct current transformer according to another embodiment of the invention.

FIG. 5 represents a second embodiment of the present invention where there is inserted $MDS_2$ into the core SR. As apparent from the foregoing description, $MSD_2$ is only required to be positioned at a place free from the magnetic fluxes generated in the core SR through the primary bus B, so that as shown in FIG. 5, $MSD_2$ may be set in a small window W surrounded by part of the core SR. The reason is that the magnetic fluxes created in the core SR do not travel through the space within said small window, but pass through that part of the core forming the periphery of the window W, so that $MSD_2$ is not affected by said magnetic fluxes. There will be obtained a better effect if $MSD_2$ is inserted into the small window in a suitable iron case. Connection of $MSD_1$ and $MSD_2$ to the storage battery BT and the feedback of a voltage difference between $MSD_1$ and $MSD_2$ to the supplementary coil CL through the differential amplifier DFA are carried out with the same circuit arrangement as in FIGS. 1 and 2.

Figure 6:
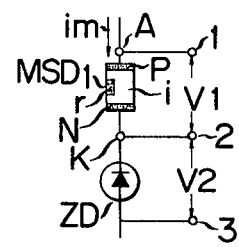
FIGS. 6, 7, 8, 9 and 11 are schematic arrangements of the main parts of direct current transformers according to still other embodiments of the invention.

As shown in FIG. 6, a third embodiment of the present invention, it is possible to serially connect $MSD_1$ and a constant voltage diode ZD used in place of $MSD_2$, supply them with a current $im$ from the storage battery BT. It is also possible to lead out the voltage output terminal 1 from the terminal A of $MSD_1$, the voltage output terminal 2 from the contact of the terminal K of $MSD_1$ with the constant voltage diode ZD and the voltage output terminal 3 from the contact of said diode ZD with the minus terminal of the storage battery BT for connection to the differential amplifier DFA as in FIG. 2. In this case, $MSD_1$ is placed in the space G defined between both ends of the core SR as in FIG. 1. With the voltage across the voltage output terminals 1 and 2 represented by $V_1$ and the voltage of the constant voltage diode across the voltage output terminals 3 and 4 by $V_2$, then it is possible to carry out exactly the same operation as in FIGS. 1 and 2 and measure the direct current ID by the output $ib$ from the differential amplifier DFA, which corresponds to $\Delta V = V_2 - V_1$.

Figure 7:
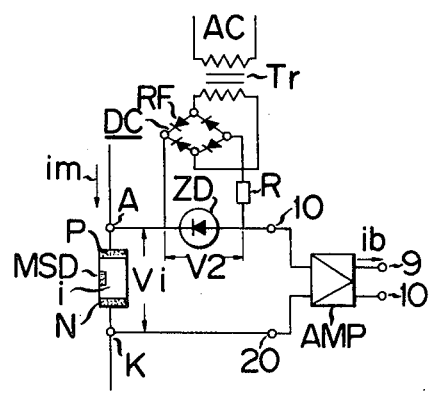

There will now be described a fourth embodiment of the present invention by reference to FIG. 7. In this case comparison is made between the voltage of $MSD_1$ and the referential voltage of a separately provided power source and the resultant voltage difference is amplified. $MSD_1$ disposed in the space defined between both ends of the core SR is supplied with a suitable current $im$ from the storage battery BT. As shown in FIG. 7, the terminal A of $MSD_1$ is connected to one terminal of the constant voltage diode ZD. A terminal 10 is led out from the other terminal of said diode ZD, and a terminal 20 from the terminal K of $MSD_1$. Both terminals of the constant voltage diode ZD are supplied through a resistor R with a direct current from a separately provided direct current source DC as shown (said source supplies through a resistor R a direct current to the constant voltage diode ZD by way of a route: an alternating current source AC – a supplementary transformer Tr – a rectifier RF for supplying a direct current) so as to impress a constant voltage $V_2$ on said diode ZD. With the terminal voltage of $MSD_1$ denoted as $V_1$, then there appears across 10 and 20 a voltage difference $\Delta V = V_2 - V_1$. Said voltage difference is amplified by an amplifier AMP and the terminals associated with resultant direct current output are connected to the terminals 4 and 5 respectively of the supplementary coil CL of FIG. 1. Such arrangement enables a feedback circuit supplying a direct current from the amplifier AMP to the supplementary coil to be controlled to $\Delta V \approx 0$, consequently $\phi D - \phi B = 0$ just as in the case of FIGS. 1 and 2, and the magnitude of the direct current ID to be determined from the output $ib$ of the amplifier AMP. Since, in this case, the current $im$ supplied to $MSD_1$ should be kept as constant as possible, it is prepared that the storage battery BT be replaced by a suitable constant current source apparatus.

Figure 8:
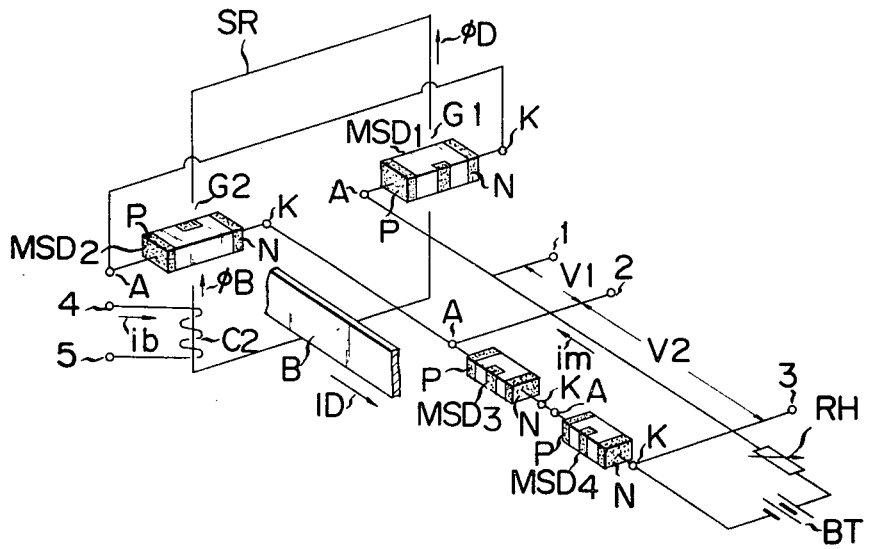

There will now be described by reference to FIG. 8 a fifth embodiment of the present invention where a plurality of (for example, four as illustrated) MSD's are employed. Through the window of the core SR is inserted a direct current bus, through which there flows a direct current ID as in FIG. 1. The core SR has two spaces $G_1$ and $G_2$ formed as shown. In these spaces $G_1$ and $G_2$ are disposed $MSD_1$ and $MSD_2$ respectively, as shown, in a manner to assume the same polarity as that of the magnetic fluxes $\phi D$ generated in the core SR by the direct current ID. As in FIG. 1, the supplementary coil CL is wound around the core SR and excited by outputs from an amplifier or the like to produce magnetic fluxes $\phi B$ of opposite polarity to the magnetic fluxes $\phi D$ generated in the core itself. There is formed a closed circuit extending from the plus terminal to the minus terminal of the storage battery BT in which a current travels through adjusting resistor RH – terminal A of $MSD_1$ – terminal K of $MSD_1$ – terminal A of $MSD_2$ – terminal K of $MSD_2$ and then through the terminals A and K of $MSD_3$ and $MSD_4$ respectively which are disposed at a point free from the effect of magnetic fluxes generated in the core SR, so as to introduce a suitable current $im$. There is led out a voltage output terminal 1 from the terminal A of $MSD_1$, a voltage output terminal 2 from the contact of the terminal K of $MSD_2$ with the terminal A of $MSD_3$ and a voltage output terminal 3 from the terminal K of $MSD_4$. With the voltage across said voltage output terminals 1 and 2 represented by $V_1$, and the voltage across said voltage output terminals 2 and 3 by $V_2$, the voltage $V_1$ varies with the direct current ID, while the voltage $V_2$ remains constant independently of the magnitude of said direct current ID. As in FIG. 2, the voltage output terminals 1, 2 and 3 are connected to the input terminals 6, 7 and 8 respectively of the differential amplifier DFA shown in this figure and the output terminals of said amplifier DFA to the terminals 3 and 5 respectively of the supplementary coil CL. As in FIGS. 1 and 2, such arrangement enables the supplementary coil CL to be excited by an exciting current $ib$ corresponding to $\Delta V = V_2 - V_1$ in proportion to the direct current ID, and the magnitude of said direct current to be determined from the readings of the output current $ib$.

The foregoing embodiment relates to the case where the core SR has two spaces in which there are positioned two MSD's. However, if there are formed more spaces in the core SR and MSD's are increased to the corresponding number, there will be obtained exactly the same effect. Use of serially connected MSD's in such large numbers will enable the output voltage $V_1$, which varies with changes in the magnetic fluxes produced in the core SR, to be much more increased than when a single MSD is employed. Accordingly, it is possible to obtain a high-sensitivity apparatus which can prominently display the value of $\Delta V_2 = V_1 - V$ even at slight variations in the magnetic fluxes $\phi D$. Further, uniform arrangement of spaces in the core SR will all the more reduce the effect of a surrounding magnetic field, thus improving the accuracy of measuring the magnitude of the direct current ID.

Figure 10:
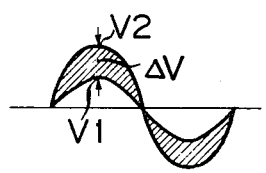
FIG. 10 is a waveform diagram illustrative of the function of FIG. 9.
Figure 9:
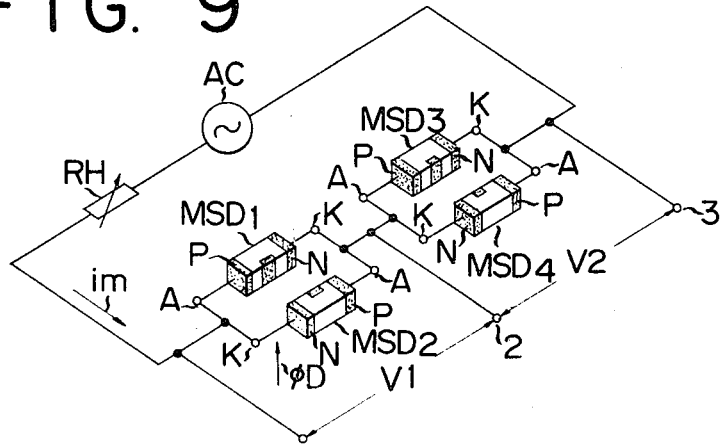

FIG. 9 represents a sixth embodiment of the present invention, namely, an MSD-type direct current measuring apparatus using a supplementary source of alternating current. As illustrated, this embodiment involves two MSD's connected in inverse parallel, that is, the terminal A of $MSD_1$ is connected to the terminal K of $MSD_2$ and the terminal K of $MSD_1$ to the terminal A of $MSD_2$. In addition to these MSD's, there are disposed two more units, namely, $MSD_3$ and $MSD_4$ at a place free from the effect of the magnetic fluxes generated in the core by the direct current ID. The latter two MSD's form an inverse parallel circuit by connecting the terminal A of $MSD_3$ to the terminal K of $MSD_4$ and the terminal K of $MSD_3$ to the terminal A of $MSD_4$. Thus there is formed a closed circuit extending from one terminal to the other of the supplementary alternating current source AC in which a current flows through adjusting resistor RH – terminal A of $MSD_1$ – terminal K of $MSD_1$ – terminal A of $MSD_2$ – terminal K of $MSD_3$. There is led out a voltage output terminal 1 from the terminal A of $MSD_1$, a voltage output terminal 2 from the terminal K of $MSD_1$ and a voltage output terminal 3 from the terminal K of $MSD_3$. The voltage across said voltage output terminals 1 and 2 is designated as $V_1$ and the voltage across the voltage output terminals 2 and 3 as $V_2$. When $MSD_1$ and $MSD_2$ are affected by the magnetic fluxes $\phi D$ generated in the core SR by the direct current ID, their resistance in the forward direction will fall to cause a slight voltage drop to be presented with respect to a current $im$ supplied by an alternating current source AC, with the result that there occurs a voltage difference as shown by the hatching of FIG. 10 between the voltage 1 across $MSD_1$ and $MSD_2$ and the voltage 2 across $MSD_3$ and $MSD_4$ which are located free from the effect of the magnetic fluxes $\phi D$. Said voltage difference is supplied to the input terminals of a differential amplifier like that of FIG. 2 to produce outputs in the form of a direct current and said current is supplied to the terminals 4 and 5 of the supplementary coil CL wound around the core SR of FIG. 1. Thus the direct current ID can be determined in exactly the same manner as in FIGS. 1 and 2.

Figure 11:
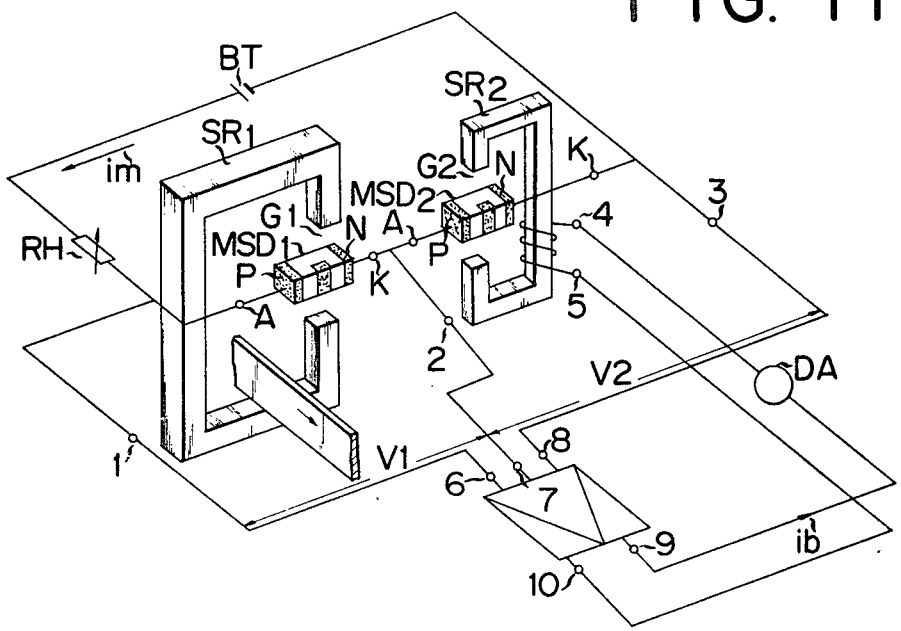

There will now be described by reference to FIG. 11 a seventh embodiment of the present invention where the direct current transformer comprises a main core member and a supplementary core member combined with MSD's. As illustrated, there is disposed the main core member $SR_1$ in a manner to surround a direct current bus B through which there travels a direct current ID. In the space defined between both ends of said main core $SR_1$ is positioned one MSD, namely, $MSD_1$. A separately provided supplementary core $SR_2$ is wound with a supplementary coil CL, and in the space defined between both ends of said supplementary core $SR_2$ is disposed another MSD, or $MSD_2$. There is formed a closed circuit extending from the plus terminal to the minus terminal of a supplementary direct current source BT in which a current $im$ travels through adjusting resistor RH – terminal A of $MSD_1$ – terminal K of $MSD_1$ – terminal A of $MSD_2$ – terminal K of $MSD_2$. There is led out a voltage output terminal 1 from the terminal A of $MSD_1$, a voltage output terminal 2 from the contact of the terminal K of $MSD_1$ with the terminal A of $MSD_2$, and a voltage output terminal 3 from the terminal K of $MSD_2$. The voltage across said voltage output terminals 1 and 2 is denoted as $V_1$ and the voltage across said voltage output terminals 2 and 3 as $V_2$. These voltage output terminals 1, 2 and 3 are connected to the input terminals 6, 7 and 8 respectively of the differential amplifier DFA as 1 to 6, 2 to 7 and 3 to 8. The output terminal 9 of the differential amplifier DFA is connected through a DC ammeter DA to the terminal 4 of the supplementary coil CL and the terminal 10 of said amplifier DFA to the terminal 5 of said coil CL. The magnetic fluxes $\phi D$ provided in the main core member $SR_1$ by the direct current ID and the magnetic fluxes $\phi B$ generated in the supplementary core $SR_2$ through the supplementary coil CL by the outputs $ib$ from the differential amplifier DFA are of such polarity as exerting a polar action on $MSD_1$ and $MSD_2$ in the same direction as their respective polarities. Now let it be assumed that the differential amplifier DFA produces current outputs $ib$ in such a manner as to balance the input voltage $V_1$ across the input terminals 6 and 7 with the input voltage across the input terminals 7 and 8. If, in this embodiment, a direct current ID flowing through the bus B causes $V_1$ to decrease according to variations in the resistance $RD_1$ of $MSD_1$ in its forward direction, then there will occur an unbalance between the input voltages $V_1$ and $V_2$ of the differential amplifier DFA, increasing the current outputs $ib$ accordingly. Thus the magnetic fluxes generated in the supplementary core $SR_2$ increase to cause the resistance $RD_2$ of $MSD_2$ in its forward direction to vary in the same manner as the resistance $RD_1$ of $MSD_1$ with the resultant drop of $V_2$ and settle at a point of $V_2 \approx V_1$. Since the current outputs $ib$ from the differential amplifier DFA are so varied as to always maintain the condition of $V_2 \approx V_1$, there results the relationship of $ib \infty$ ID. Accordingly, the magnitude of the direct current ID travelling through the bus B can be determined by reading $ib$ from the DC ammeter DA.

What is claimed is:

1. A direct current transformer comprising a C-shaped core excited by a direct current to be measured which flows through a conductor penetrating the interior space of said core; a supplementary coil wound on part of the core for generating magnetic fluxes in such a direction as to offset the magnetic fluxes produced by the direct current; a magnetosensitive semiconductor device having rectifier characteristics disposed in the space defined between both ends of the C-shaped core; a constant voltage element serially connected to the magnetosensitive semiconductor device for producing a constant voltage output without being affected by the magnetic field prevailing in the core; a power source for impressing a voltage on a circuit comprising the magnetosensitive semiconductor device and constant voltage element connected in series; a means for impressing the supplementary coil with a voltage which is a function of the difference between the voltage across the magnetosensitive semiconductor device and the voltage across the constant voltage element, said means for impressing providing an output current which is a function of the direct current to be measured which current may be applied to a current-measuring device for providing a readout.

2. The direct current transformer according to claim 1 wherein the constant voltage element is disposed within an opening in the core to obstruct the passage of magnetic fluxes.

3. The direct current transformer according to claim 1 wherein the constant voltage element comprises a constant voltage diode impressed with a constant voltage.

4. A direct current transformer comprising a closed circuit involving a core through the interior space of which is inserted a conductor receiving a direct current to be measured and having a plurality of separate spaces formed in part of said core; a coil wound around part of the core for generating magnetic fluxes in such a direction as to offset the magnetic fluxes produced by the direct current; a plurality of magnetosensitive semiconductor devices having rectifier characteristics positioned in the separate spaces and connected in such a manner that each of them has a polarity directed in the same way as the magnetic fluxes prevailing in the core; mutually serially connected constant voltage elements having the same number as said plurality of magnetosensitive semiconductor devices, serially connected to the output terminals of said magnetosensitive semiconductor devices and so disposed as to be kept free from the effect of the magnetic field prevailing in the core; a power source for impressing a voltage on a circuit comprising said plurality of magnetosensitive semiconductor devices mutually connected in series and another circuit comprising said plurality of constant voltage elements mutually connected in series; and a means for impressing the supplementary coil with a voltage which is a function of the difference between the voltage output from the output terminals of the circuit comprising said plurality of magnetosensitive semiconductor devices and the voltage output from the output terminals of the circuit comprising said plurality of constant voltage elements, said means for impressing providing an output current which is a function of the direct current to be measured which current may be applied to a current-measuring device for providing a readout.

5. A direct current transformer comprising a first C-shaped core excited by a direct current to be measured which flows through a conductor penetrating the interior space of said core; a second C-shaped core located at a point free from the effect of the magnetic fluxes prevailing in said first C-shaped core; a first magnetosensitive semiconductor device having rectifier characteristics disposed in the space defined between both ends of said first C-shaped core and varying in its forward resistance in accordance with the change at said space of the magnetic fluxes generated in the core by the direct current flowing through the conductor; a second magnetosensitive semiconductor device having rectifier characteristics positioned in the space defined between both ends of said second C-shaped core and serially connected to said first magnetosensitive semiconductor device; a supplementary DC power source for supplying a current to a circuit comprised of said serially connected first and second magnetosensitive semiconductor devices; a coil wound around the second C-shaped core for generating magnetic fluxes in such a manner as to cause them to exert a polar action on said first and second magnetosensitive semiconductor devices in the same direction as their respective polarities; and a means including a variable amplification factor differential amplifier for impressing the coil with the voltage difference between the voltage outputs from the first magnetosensitive semiconductor device and the voltage outputs from the second magnetosensitive semiconductor device in such a manner that the voltages prevailing across both ends of the respective first and second magnetosensitive semiconductor devices are made equal by said voltage difference, whereby the value of a current introduced through a DC ammeter due to said voltage difference is measured to find the value of the direct current traveling through the conductor.

6. The direct current transformer according to claim 1 wherein the forward resistance of said magnetosensitive semiconductor varies in response to said magnetic field.

7. The direct current transformer according to claim 4 wherein the forward resistance of said magnetosensitive semiconductor varies in response to said magnetic filed.

8. The direct current transformer according to claim 5 wherein the forward resistances of said magnetosensitive semiconductors vary in response to said magnetic field.

9. The direct current transformer according to claim 1 wherein said means for impressing said supplementary coil with said voltage difference includes a differential amplifier having a variable amplification factor receiving said constant voltage and the output voltage from said magnetosensitive device, the accuracy of said transformer being varied by varying said amplification factor.

10. The direct current transformer according to claim 4 wherein said means for impressing said supplementary coil with said voltage difference includes a differential amplifier having a variable amplification factor receiving said constant voltages and the output voltages from said magnetosensitive devices, the accuracy of said transformer being varied by varying said amplification factor.

* * * * *